3,354,386
APPARATUS FOR DETECTING DISCONTINUITIES IN INSULATED CONDUCTORS INCLUDING CAPACITIVELY COUPLED SCHMITT TRIGGER MEANS
Louis J. Daigle, Manchester, and William Cohen, West Hartford, Conn., assignors to United Aircraft Corporation, East Hartford, Conn., a corporation of Delaware
Filed Nov. 16, 1966, Ser. No. 594,914
1 Claim. (Cl. 324—51)

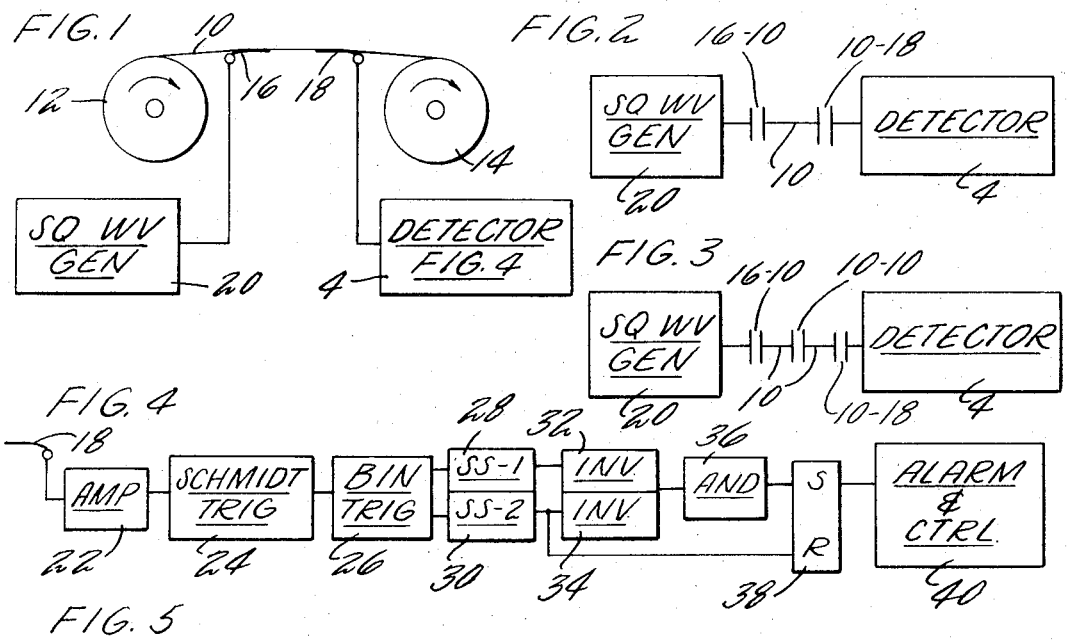

ABSTRACT OF THE DISCLOSURE

Discontinuities in an electrical conductor are measured by capacitively coupling a square-wave generator through the insulation of the electrical conductor to a detector which includes a Schmitt trigger dependent upon sufficient amplitude of current passed through the capacitive coupling. The Schmitt trigger fires a binary trigger, each side of which is fed through suitable pulse stretchers for mixing in an AND circuit that controls a trigger which represents a failure of the conductor. Discontinuity in the conductor will result in too great a series capacitance so that the Schmitt trigger will not fire; this results in an alarm condition; thus the circuit is failsafe and can be operated automatically without constant monitoring.

Field of invention

This invention relates to devices for locating discontinuities or breaks in insulated conductors, and more particularly to a simple device for locating discontinuities in an insulated wire without breaching the insulation so as to make electrical contact with the wire.

Description of the prior art

In the manufacture of insulated electrical conductors, a customary step is to test each wire or conductor for continuity. In order to avoid breaching the insulation or otherwise lowering the quality of the wire, it is necessary to perform the continuity test without making actual contact with the electrical conductor midway along its length. Since wire of this type is most expeditiously made in substantilly endless lengths, it is advantageous to provide a nondestructive continuity test which can continuously monitor differential lengths of the electrical conductor for continuity through the insulation which surrounds the conductor.

The special properties of certain modern-day insulating materials may require that the process for manufacturing electrical insulated electrical conductors avoid subjecting the finished product to torturous routes or unduly small or tight loops.

Summary of invention

In accordance with the present invention the detecting of discontinuities in insulating conductors includes moving an insulating conductor to be tested longitudinally along a predetermined path adjacent to a pair of contact means which form, with the conductor, capacitors which are serially connected by the conductor, one contact means being connected to a source of electrical energy and the other contact means being connected to a detector responsive to electrical energy. In the absence of discontinuities in the conductor there is a substantial transfer of energy from the source to the detector. When there is a discontinuity or break in the conductor, then an additional small capacitance is inserted in the serial connection between the source and the detector so that a substantially lesser amount of energy is transferred from the source to the detector.

An object of the present invention is to provide a failsafe insulated wire continuity test.

Another object of the present invention is to provide a simple apparatus for measuring differential elements of an insulated conductor for continuity without the need for constant monitoring of the process by an operator.

A further object of the present invention is to provide such a continuity tester for insulated electrical conductors which does not subject the conductor to a torturous route or to any loops smaller than those required for packaging the conductor on a reel.

In a preferred embodiment of the present invention, a test circuit is capacitively coupled to a square wave generator through an electrical conductor, the continuity of which is to be tested. The conductor which is to undergo a continuity test is unwound from a supply reel and taken up upon a takeup reel. Between the two reels there are positioned a pair of spring leaf contactors against which the insulated wire is drawn as it traverses the distance between the two reels. One of the spring leaf contactors is attached to the square wave generator, and the other spring leaf contactor feeds a detecting apparatus. The eqivalent electrical circuit of the apparatus of the present invention, when there are no discontinuities of the wire, equals a square wave generator with two capacitors in series feeding the detecting apparatus. If there is a discontinuity in the wire, the discontinuity represents an additional very small coupling capacity and the equivalent circuit thereupon becomes the series circuit of three capacitors between the energy source and the detecting apparatus.

In accordance with more specific aspects of the present invention, the detecting apparatus may include an amplifier which feeds a Schmitt trigger, the operation of which is dependent upon sufficient amplitude of input applied thereto from the amplifier. Thus, the Schmitt trigger will operate in response to the output of the amplifier when the conductance between the energy source and the detector is sufficiently large (that is, when the capacitive impedance between the source and the detector is relatively small); and the Schmitt trigger will not operate when, due to the increase of capacitive impedance as a result of a discontinuity in the conductor, the amplitude of signal applied to the Schmitt trigger is much smaller. The threshold of response for the Schmitt trigger is chosen to be slightly below the signal level from continuous wire so that it will not respond to the smaller signal resulting from bad wire.

In accordance with still further aspects of the invention, the output of the Schmitt trigger may be utilized to fire a binary trigger, each side of which is fed through suitable pulse stretchers such as monostable multivibrators (or "single shots"), the outputs of which overlap each other in time and are monitored so that when there is no output from either of these devices, an AND circuit will cause the setting of a bistable trigger or latch, the output of which may operate an alarm or control device. The bistable trigger or latch may again be reset in response to either of the single shots having an output indicating that good wire is again being detected. The device is thus failsafe.

The invention provides a relatively simple means of detecting discontinuities in insulated wire without access to the electrical conductor. Additionally, there is no need for delicate balancing of the circuit parameters being used since the indicium of the discontinuity is impedance, which is relatively simple to monitor in terms of a voltage transmitted therethrough.

The foregoing and other objects, features and advantages of the present invention will become more apparent in the light of the following detailed description of a preferred embodiment thereof, as illustrated in the accompanying drawings.

Brief description of the drawing

FIG. 1 is a simplified, semi-diagramatic illustration of discontinuity detecting apparatus in accordance with the present invention;

FIG. 2 is a simplified schematic illustration of the equivalent circuit of apparatus in accordance with the present invention when monitoring wire without discontinuities;

FIG. 3 is a simplified schematic illustration of the equivalent circuit of apparatus of the present invention when monitoring wire having a discontinuity therein;

FIG. 4 is a simplified schematic block diagram of a detector for use in the embodiment of FIG. 1;

FIG. 5 is a timing diagram illustrating voltage relationships in the embodiment of the present invention illustrated in FIGS. 1 and 2.

Description of the preferred embodiment

Referring now to FIG. 1, insulated electrical conductor wire 10 which is to be tested for breaks or discontinuities is transferred from a supply reel 12 to a takeup reel 14 over a path which causes the insulation on the wire 10 to be in contact with each of a pair of spring contacts 16, 18. A square wave generator 20 supplies a source of energy to the spring contact 16, the insulation on the wire acting as a dielectric and the conductor in the wire 10 acting as an additional plate so as to form a capacitor, the conductor of the wire 10 also acting as an electrical conducting circuit so as to conduct any energy induced therein to the area of another spring contact 18, which also forms a capacitor with the conductor 10. The spring contact 18 is connected to a detector 4 the details of which are illustrated in FIG. 4 and described hereinafter.

When wire which does not have a break or discontinuity in the conductor is passing over the spring contact 16, 18 as it traverses between reels 12, 14 the apparatus of FIG. 1 has an equivalent circuit as illustrated in FIG. 2 which is seen to be equal to a pair of capacitors 16–10, 10–18, between the square wave generator 20 and the detector 4. The capacitor 16–10 results from the spring contact 16 in combination with the conductor 10, and the capacitor 10–18 results from the conductor 10 in combination with the spring contact 18.

When there is a discontinuity in the wire in the path between the spring contacts 16, 18 then the equivalent circuit of the apparatus of FIG. 1 is as illustrated in FIG. 3. Therein, an additional capacitor 10—10 results from the two lengths of wire which are separated by the discontinuity or break in the conductor. Thus, there are now three capacitors in series, rather than the two capacitors in series illustrated in FIG. 2. Thus, there is a larger capacitive reactance in the series circuit between the square wave generator 20 and the detector 4. A suitable ground return line (not shown) can be supplied between the generator 20 and the detector 4, as well as between other elements of the circuitry. By measuring, in some fashion, this increase in capacitive reactance, or reduction in conductance, the determination of a break in the electrical conductor can readily be made. Measuring of this change is achieved in the detector 4.

In FIG. 4, an amplifier 22 responds to signals applied thereto through the spring contact 18, and provides an amplified manifestation of the signals to a Schmitt trigger 24. As is well known in the electronic art, a Schmitt trigger has the characteristics of being settable between two stable states in response to either positive or negative changes in potential which are of sufficient amplitude so as to match the design threshold of the Schmitt trigger. In the embodiment herein, the Schmitt trigger is biased so as to respond to positive inputs only, so that it will operate at the frequency of the square wave generator 20 and it will trigger on the positive going edge of the signal from the generator. Thus, when sufficient energy is passed from the square wave generator 20 through the series capacitances including the spring contact 16, 18 to the amplifier 22, the Schmitt trigger will fire once for each pulse of positive polarity supplied by the amplifier 22 so long as there is no break in the wire.

The output of the Schmitt trigger 24 is applied to a binary trigger 26 which, as is well known in the electronics art, will change from a first stable state to a second stable state each time that the polarity of change of input voltage is in a particular direction (such as on the positive rise of an input wave form as illustrated in FIG. 5 herein). Thus, the output of the binary trigger 26 will change from positive to negative in a manner which is at half the frequency of the square wave generator. Each side of the binary trigger 26 is applied to a related single shot: SS1, 28: SS2, 30. As is well known in the electronic art, a single-shot, sometimes referred to as a "one shot," is a delayed monostable multivibrator which, when it received an input signal of an appropriate polarity, will turn on and remain on for a given length of time determined by its parameters, and will then return to the normally off or reset condition. The delay time of the single shots 28, 30 is caused to be a little greater than one half of the period of the binary trigger output wave form so that the ON states of the two single shots will overlap. Thus, one of the single shots 28, 30 will be on at any particular moment so long as good wire is being sensed and there is therefore a square wave output from the binary trigger 26. Whenever the output of the binary trigger assumes a steady-state condition (due to a length of bad wire being detected) then the single shots 28, 30 will both have had time to time-out, so there will be no output from either of them.

The output of each of the single shots 28, 30 is applied to a corresponding inverter 32, 34 which in turn feed an AND circuit 36. When both single shots have timed-out following the introduction of a discontinuity between the leaf springs 16, 18 (FIG. 1), there will be no output from either of the single shots 28, 30 and therefore no input to either inverter 32, 34; under these conditions both inputs will be present at the input of the AND circuit 36 so that there will be an output therefrom applied to a bistable trigger or latch 38. The AND circuit 36 will therefore set the trigger 38 into its on or set (S) condition and the output therefrom may operate any suitable alarm and control circuits 40. The alarm and control circuits 40 may include audible and visual means to alert a test operator, and also may include circuitry to automatically stop the movement of the reels 12, 14 as is known in the art. Failure of any of the components 10–30 will cause the trigger 38 to be set, thus rendering the circuit failsafe.

The circuit of FIG. 4 is illustrative of a preferred form of detector, but it will be understood by those skilled in the art that the functions performed therein include the determination that a suitable voltage is being transmitted from the power source (such as square wave generator 20) to the detector, and transposing this into a positive indication of the lack of such voltage when it is not present. Thus, the circuit of FIG. 4 provides at the alarm and control circuits 40 a positive indication when there is a discontinuity in the wire as it traverses between the reels 12, 14. It will be apparent to those skilled in the art that various other forms of detectors may be utilized, and more particularly that the invention herein is readily adapted to a variety of embodiments in which a discontinuity in a wire can be monitored by relatively simple equipment capable of efficient operation without critical adjustment. The size, shape, and position of the contacts 12, 14 may be adjusted along with the frequency and voltage of the generator 20 so as to suit particular design parameters.

There has thus been described a preferred embodiment of a discontinuity detector for insulated conductors in accordance with the present invention, but it should be understood by those skilled in the art that various changes and omissions in the form and detail thereof may be made therein without departing from the spirit and the scope of the invention, which is to be limited only as set forth in the following claim.

What we claim as new and desire to secure by Letters Patent of the United States is:

Apparatus for detecting discontinuities in insulated conductors comprising:

means for moving an insulated electrical conductor longitudinally along a predetermined path;

first and second longitudinally spaced contact means disposed along said predetermined path, each of said contact means contacting the insulation of said electrical conductor as it moves along said path, each of said contact means consisting solely of an electrically conductive plate having a finite area so as to form one plate of a respective capacitor, the other plate of the capacitor so formed with each contact means comprising the conductor under test;

a source of alternating electrical current connected to one of said contact means;

a detector connected to the other of said contact means, said detector comprising a Schmitt trigger having a pair of alternatively operable outputs;

a binary trigger settable to opposite ones of a pair of stable states in response to corresponding outputs from said Schmitt trigger;

a pair of pulse stretchers, each connected to a respective output of said binary trigger;

means connected to the outputs of said pulse stretchers for detecting the absence of a signal from both of said pulse stretchers concurrently;

bistable means responsive to said last named means to be set into a first state, and responsive to one of said pulse stretchers to be set into a second state;

and means responsive to the setting of said bistable means into said first state for providing an indication of a discontinuity in the conductor under test.

References Cited

UNITED STATES PATENTS

| | | | |
|---|---|---|---|
| 2,999,168 | 9/1961 | Henry | 328—115 X |
| 3,096,478 | 7/1963 | Brown | 324—54 |
| 3,125,821 | 3/1964 | Schumann et al. | 328—116 X |
| 3,209,268 | 9/1965 | Fraunfelder et al. | 328—150 X |
| 3,259,891 | 7/1966 | Coulter et al. | 324—71 X |

FOREIGN PATENTS

| | | |
|---|---|---|
| 545,916 | 9/1957 | Canada. |
| 1,236,088 | 6/1960 | France. |
| 881,415 | 11/1961 | Great Britain. |

RUDOLPH V. ROLINEC, *Examiner.*

G. R. STRECKER, *Assistant Examiner.*